Jan. 13, 1925.
J. T. RYAN
WINDMILL
Filed Oct. 27, 1923
1,523,295
2 Sheets-Sheet 2
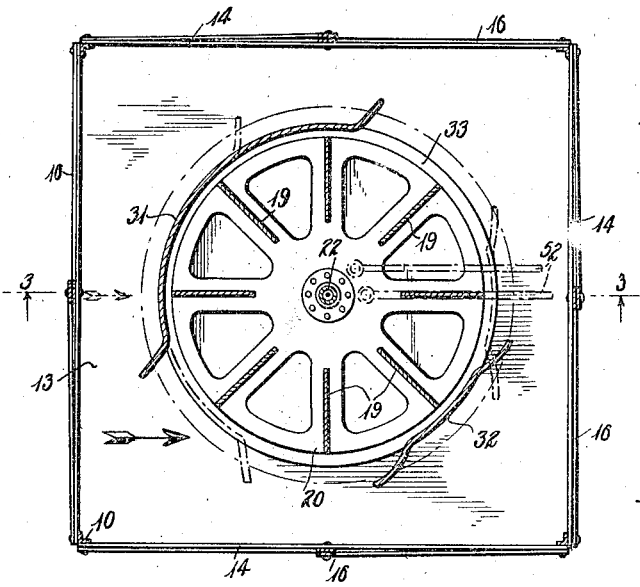
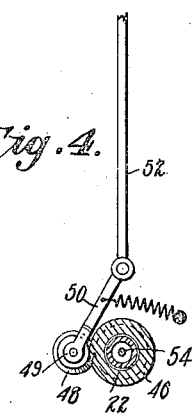
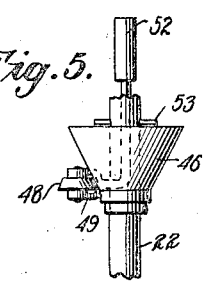
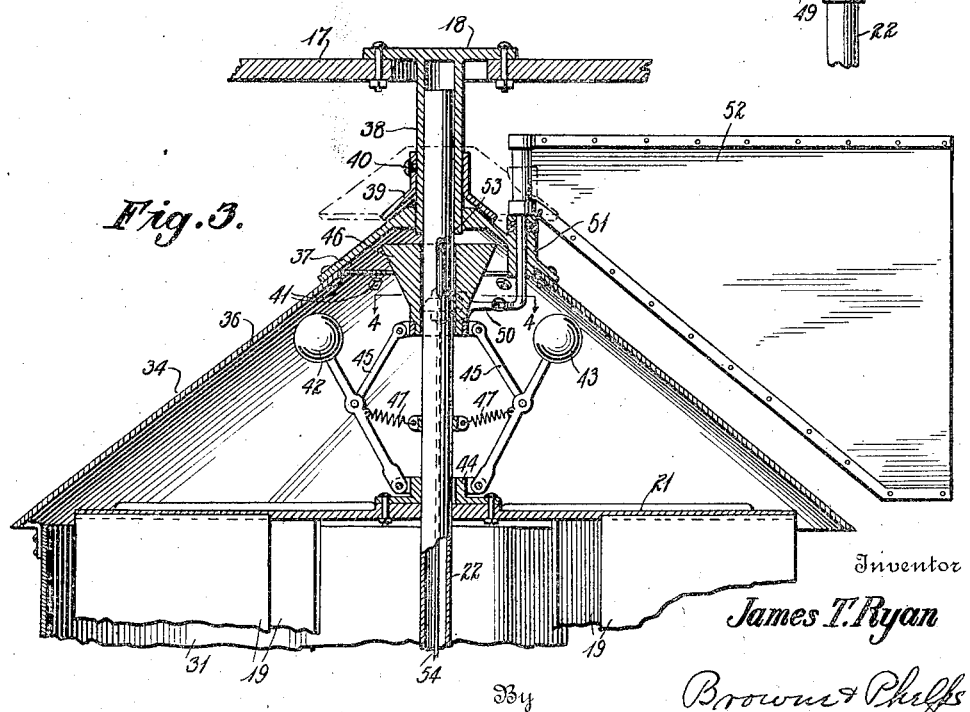
Inventor
James T. Ryan
By Brown & Phelps
Attorneys Patented Jan. 13, 1925.

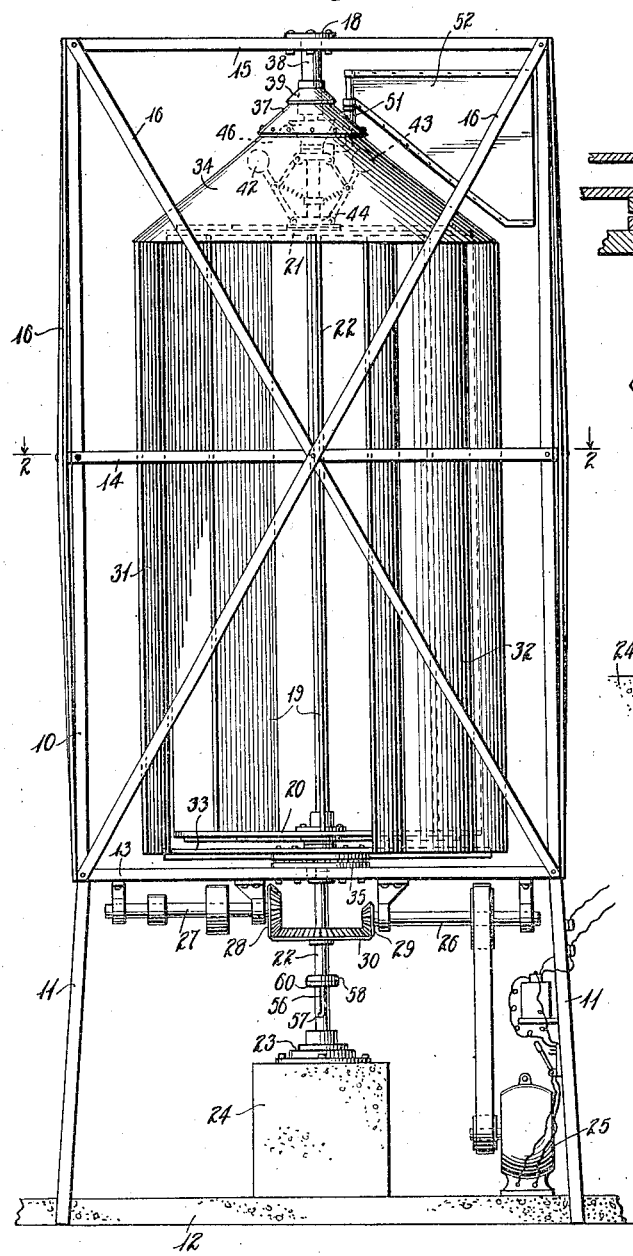
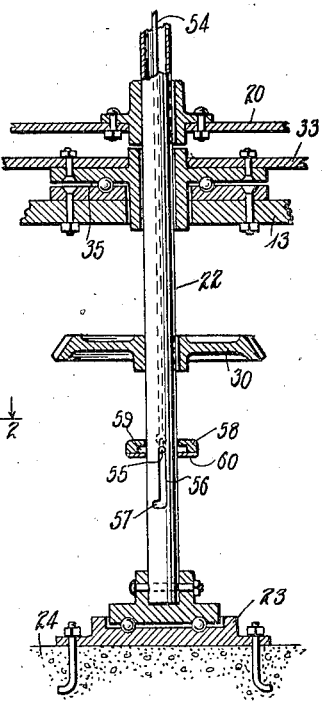
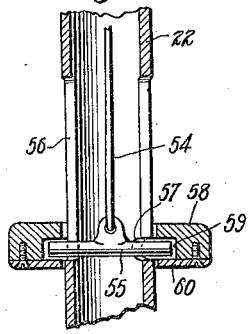

1,523,295

UNITED STATES PATENT OFFICE.

JAMES T. RYAN, OF FRANKFORT, KENTUCKY.

WINDMILL.

Application filed October 27, 1923. Serial No. 671,135.

*To all whom it may concern:*

Be it known that I, JAMES T. RYAN, a citizen of the United States, residing at Frankfort, in the county of Franklin and State of Kentucky, have invented certain new and useful Improvements in Windmills, of which the following is a specification.

The invention relates to windmills, and has as an object the provision of a windmill having speed regulating means whereby a substantial speed may be given the driven machinery, such as electric generators, to keep the voltage output thereof substantially uniform and, therefore, practicable for use.

A further object of the invention is the provision of a windmill which will generate large power without excessive height.

A further object of the invention is the provision of a windmill that shall be rugged and withstand high winds without damage.

Further objects of the invention will appear from the following description when read in connection with the accompanying drawings, wherein, Fig. 1 is a side elevation.

Fig. 2 is a horizontal section on line 2, 2, of Fig. 1, with the vane shown in dotted lines.

Fig. 3 is a detail vertical section on an enlarged scale on line 3, 3 of Fig. 2.

Fig. 4 is a detail horizontal section on line 4, 4 of Fig. 3, showing the vane and its controlling roller in plan.

Fig. 5 is a detail elevation of the controlling cone.

Fig. 6 is a detail vertical sectional view of the lower portion of the driving shaft and the thrust bearings.

Fig. 7 is a detail vertical section on a still further enlarged scale of the controlling means for the governor.

As shown, the device comprises a frame 10, square in plan, formed of vertical angle irons 11 extending to the foundation 12, and with horizontal angle members 13, 14, 15 and diagonal braces 16. The top is shown as formed with cross members 17 to receive the upper pivotal bearings 18 for the moving elements of the device.

The power of the wind is applied to a rotor comprising wings or blades 19 attached to a lower spider 20, and an upper spider 21, the main spiders being rigidly secured to a hollow shaft 22, which may be made of wrought pipe of suitable dimensions. To support the weight of the movable power receiving portion of the device, there is shown a thrust bearing 23, preferably of ball bearing type, as shown in Fig. 6, which is desirably mounted upon a concrete block 24.

To apply the power to machinery, such as an electric generator 25, there are shown counter shafts 26, 27, driven by bevel gears 28, 29, coacting with a gear 30, rigidly secured to the shaft 22. The gears 28, 29 may vary in diameter so as to secure various counter shaft speeds, and more than two counter shafts may be utilized if desired. The wings or blades 19 may be formed of sheet metal or of frames covered with strong canvas, or in any other suitable manner. To govern the speed of the mill and to hold the same stationary even in the presence of high wind, when desirable, there is shown a shield comprising a vertical shield element 31 and a deflector 32 which may be secured at their lower ends to a frame or disk 33, and are shown as connected at their upper ends to a conical shield 34. The weight of the entire shield member is carried by the lower disk or spider 33, and upon a thrust bearing 35, also preferably of the ball bearing type.

The conical shield 34 acts as a centering device for the shield and deflector elements 31 and 32 respectively and as a protection from the weather for the governor to be described. To render access to the governing device easy, the shield 34 is shown as formed in two portions 36 and 37, the latter being desirably formed of cast material and bearing against the tubular downward projection 38 of the upper bearing 18. The rain shield 39 is shown to shed water away from the bearing of the member 37, against the tubular portion 38, which shield may be attached thereto by means of a set-screw 40. In assembly of the device, or when access to the governor element is desired, the member 37 may be slid to the dotted line position upon the tubular member 38, and when the device is to be placed into operation may be slipped down to the full line position of Fig. 3 and secured, as by means of bolts 41, to the element 36.

To govern the speed of the device, there is shown a pair of centrifugal ball governors, 42, 43, pivoted at 44, to a collar secured to the upper spider 21, and having their levers 45 pivotally attached to wings upon the lower end of a frusto conical member 46. Springs 47 are provided to hold the balls normally in their retracted position. When the mill is revolved by the wind the governor will expand in the well known manner, drawing the frustrum downwardly, thereby acting upon a roller 48, which roller is shown as borne in a clevis 49, carried by the end of a crank 50 passing through a bearing 51 mounted upon the portion 37, and having a vane or tail 52 rigidly secured thereto.

As the speed of the device increases and the frustrum 46 is depressed by the governors, the vane will be revolved by the crank 50 so as to approach the dotted line position in Fig. 2, thereby through the influence of the wind upon the vane swinging the shield 31 more into the wind and the deflector 32 more out of the wind thus providing a less effect of the wind upon the blades of the mill.

The direction of the wind is shown by an arrow in Fig. 2. To throw the mill out of gear even though the wind may be blowing, it is desirable to throw the vane into the dotted line position of Fig. 2, which will cause the shield 31 and deflector 32 to assume the dotted line position in that figure where the wind will strike a central portion of the shield, as shown by the dotted arrow in the same figure, the wind remaining in its original direction. To provide such control, there is shown a pin 53, carried by a rod, or cable 54, hanging through the hollow shaft or pipe 22, which pin projects through longitudinal slots in the wall of the shaft or pipe and bears against the base of the frustrum 46. The lower end of the rod 54 is shown as secured to a second pin 55, also projecting through slots 56 in the walls of the shaft, which latter slot ends at a recess 57. To depress the rod 55, there is shown an annular disk 58 having a rabbet 59 in its lower side, and a washer 60 to retain the pin 55 in the rabbet. When it is desired to throw the mill out of gear, the attendant places his hands upon the disk 58 and pulls downwardly. The shaft 22 meanwhile being in revolution, and the pin 55 revolving in the rabbet 59. When the pin reaches the bottom of the slot 56 the friction of the pin 55 will cause the said pin to enter the recess 57, thereby locking the pin in its lowermost position and holding the frustrum 46 fully depressed, whereby the vane 52 will be thrown into the dotted line position in Fig. 2, and the wind acting upon the vane will swing the shield 31, so as to prevent effect of the wind upon the blades 19.

The deflector 32 has as its function the deflecting of wind upon the blades 19. As the vane is moved under the influence of the governor, the deflector being secured at its lower end to the disc 33 and at its top to the conical shield 34 revolves with the shield 31 in such a manner as to aid in balancing the shield 31 against the wind and to increase or lessen the influence of the wind upon the blades, according to the strength of the wind. The out-turned ends of the deflector 32 and of the shield 31, provide a greater variation in the effect of the wind upon the rotor, with a smaller angular change in the deflector element than would be had without these ends.

While the bearings of the cone 34 upon the tubular member 38 and of the shaft 22 within the same are shown as plain bearings, it is well understood that any desirable anti-friction elements may be supplied if the service requires.

Minor changes may be made in the physical embodiment of the invention without departing from its spirit.

I claim:

1. A windmill comprising, in combination, a rotor having vertical blades, a shield, means for moving said shield to vary the effect of the wind upon said rotor, said shield comprising a vertical element, a bottom supporting element and an upper roof element covering said rotor.

2. A windmill comprising, in combination, a rotor mounted to revolve upon a vertical axis, a controlling element comprising a revoluble shield, a roof member rigidly secured to said shield and carrying a central bearing for said controlling element, and means revolving with said rotor covered by said roof element for governing the movements of said shield to control the effect of the wind upon said rotor.

3. A windmill comprising, in combination, a rotor mounted to revolve upon a vertical axis, a shield mounted to revolve upon an axis concentric with said rotor, a roof rigidly secured to said shield covering said rotor and carrying an upper bearing for said shield, a vane carried by said roof adapted to swing said shield according to the direction of the wind, and means housed within said roof to adjust the angle of said vane.

4. A windmill comprising, in combination, a rotor mounted to revolve upon a vertical axis, a shield mounted to revolve upon an axis concentric with said rotor, a roof rigidly secured to said shield covering said rotor and carrying the upper bearing for said shield, a vane carried by said roof adapted to swing said shield according to the direction of the wind, and means housed within said roof to adjust the angle of said vane comprising a centrifugal governor to swing said vane in accordance with the speed of the rotor to maintain said speed substantially uniform.

5. A windmill comprising, in combination, a rotor mounted to revolve upon a vertical axis, a shield, a roof rigidly secured to said shield covering said rotor, a vane pivotally carried by said roof, a crank upon the axis of said vane projecting within the roof, means operable from the lower portion of said mill to act upon said crank to vary its angle whereby to swing said shield into the wind to prevent effect thereof upon said rotor.

6. A windmill comprising, in combination, a rotor, a hollow vertical shaft carrying said rotor, a shield mounted to revolve concentrically with said rotor and independently thereof, a vane pivotally carried by said shaft upon a vertical axis, a crank carried by the pivot of said vane, an inverted frustrum of a cone slidable upon said shaft adapted when depressed to actuate said crank to vary the angle of said vane, a pin extending through longitudinal slots in said shaft and bearing on the base of said frustrum, a rod secured to said pin and depending within said shaft, means urging said frustrum to its uppermost position, a second pin secured to said rod projecting through other longitudinal slots in said shaft, and means operable by an attendant to depress said second pin, whereby to depress said frustrum to vary the angle of the vane and cause the wind to swing said shield to prevent effect of the wind upon said rotor, means to lock said last named pin in depressed position.

7. A windmill comprising, in combination, a rotor having blades to be acted upon by the wind, a shield partially enclosing said blades, a deflector closing a portion of the remaining portion of the periphery of said rotor and having its edges spaced from the edges of said shield to provide openings for entry and exit of the wind, means for mounting said shield and deflector for free revolution as a unit with their edges in fixed relation to each other and means to control the angle at which said openings are presented to the wind.

8. A windmill comprising, in combination, a rotor having vertical blades and mounted to revolve upon a vertical axis, a controlling member comprising a wind shield and deflector rigidly fixed to a roof member and a bottom supporting member and spaced approximately on opposite sides of said rotor, outwardly turned edges on said deflector practically effecting a balance against rotation of the controlling member by the wind, means covered by said roof for moving said controlling member concentrically about the rotor to vary the effect of the wind on said rotor.

9. A windmill comprising, in combination, a rotor having vertical blades and mounted to revolve upon a vertical axis, a controlling member comprising a revolvable shield and deflector mounted to turn as a unit on centrally located bearings, a roof member carrying one central bearing, means covered by said roof member and revolving concentrically with the shaft of said rotor for moving said shield and deflector, outwardly bent edges on said shield effecting with a small movement of said controlling member a greater control over the wind on said rotor.

JAMES T. RYAN.